(12) United States Patent
Gianakopoulos

(10) Patent No.: US 11,897,615 B2
(45) Date of Patent: Feb. 13, 2024

(54) TABLET HOLDER

(71) Applicant: Kosta Gianakopoulos, Santa Fe Springs, CA (US)

(72) Inventor: Kosta Gianakopoulos, Santa Fe Springs, CA (US)

(73) Assignee: Reinhold Industries, Inc., Santa Fe Springs, CA (US)

( * ) Notice: Subject to any disclaimer, the term of this patent is extended or adjusted under 35 U.S.C. 154(b) by 409 days.

(21) Appl. No.: 17/201,904

(22) Filed: Mar. 15, 2021

(65) Prior Publication Data

US 2021/0291984 A1   Sep. 23, 2021

Related U.S. Application Data

(60) Provisional application No. 62/991,959, filed on Mar. 19, 2020.

(51) Int. Cl.
*B64D 11/00* (2006.01)
(52) U.S. Cl.
CPC ............... *B64D 11/00152* (2014.12)
(58) Field of Classification Search
CPC ............ B60R 11/0235; B60R 11/0252; B60R 2011/0276; B60R 2011/0015; B60R 2011/0082; B60R 2011/0085; B60R 2011/0087; B60R 11/02
See application file for complete search history.

(56) References Cited

U.S. PATENT DOCUMENTS

| | | | |
|---|---|---|---|
| 5,000,511 | A | 3/1991 | Shichijo et al. |
| 7,040,699 | B2 | 5/2006 | Curran et al. |
| 8,523,130 | B2 | 9/2013 | Westerink |
| 8,704,960 | B2 | 4/2014 | Weaver |
| 10,029,792 | B2 | 7/2018 | Heredia et al. |
| 10,322,805 | B2 | 6/2019 | Westerink |
| 2016/0176357 | A1 | 6/2016 | Maslakow |
| 2017/0021928 | A1 | 1/2017 | Satterfield |
| 2017/0129413 | A1* | 5/2017 | Yu .................. F16M 13/02 |

FOREIGN PATENT DOCUMENTS

| | | |
|---|---|---|
| FR | 3072916 | 5/2019 |
| WO | WO2017074271 | 5/2017 |

* cited by examiner

*Primary Examiner* — Corey N Skurdal
(74) *Attorney, Agent, or Firm* — James E. Brunton

(57) ABSTRACT

The present invention concerns a tablet support that can be readily affixed to one side of a substantially upright seatback and one that can conveniently function to support numerous types of informational displays, including, but not limited to books, magazines, tablet computers, note book computers, media players, smart phones and the like.

10 Claims, 8 Drawing Sheets

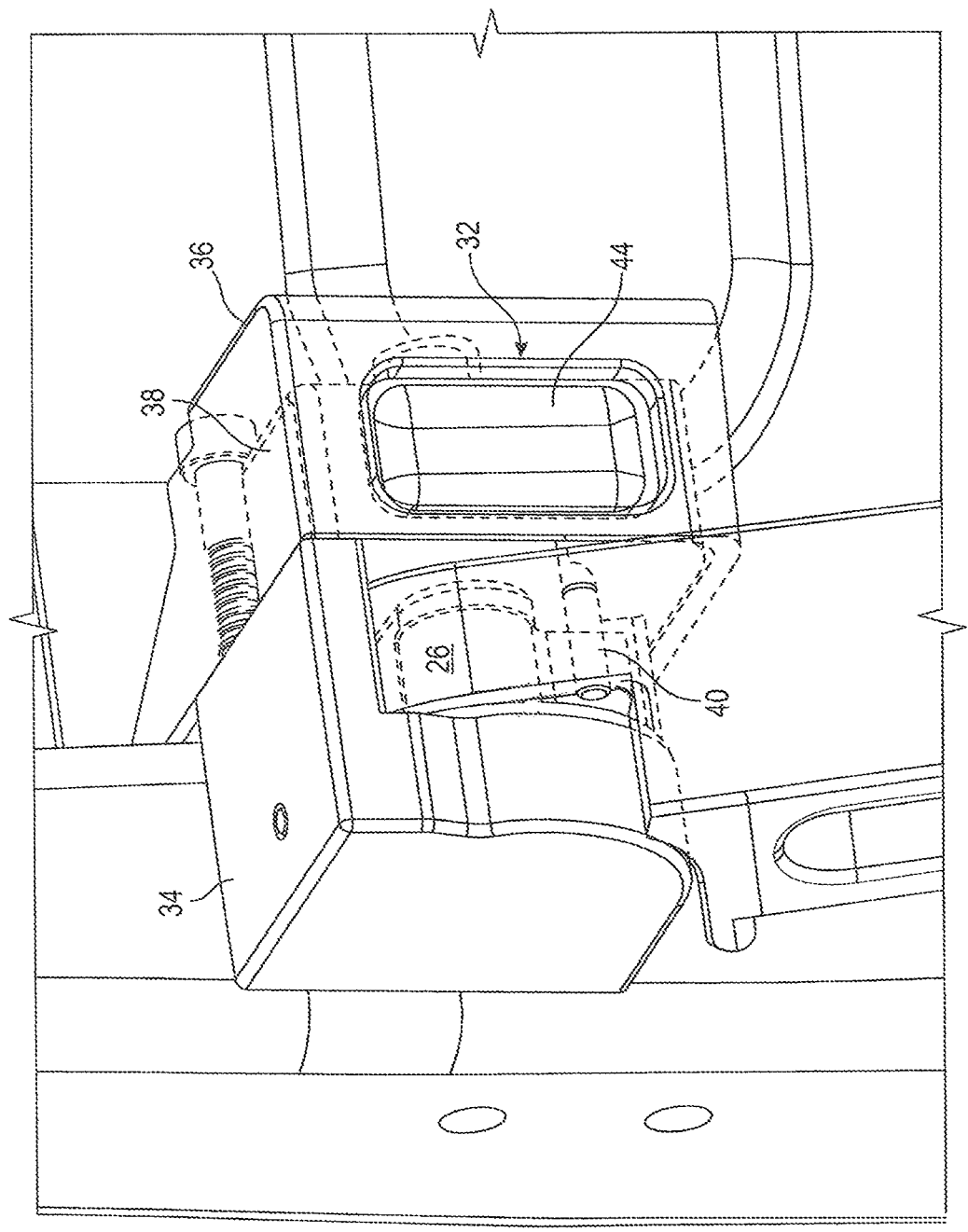

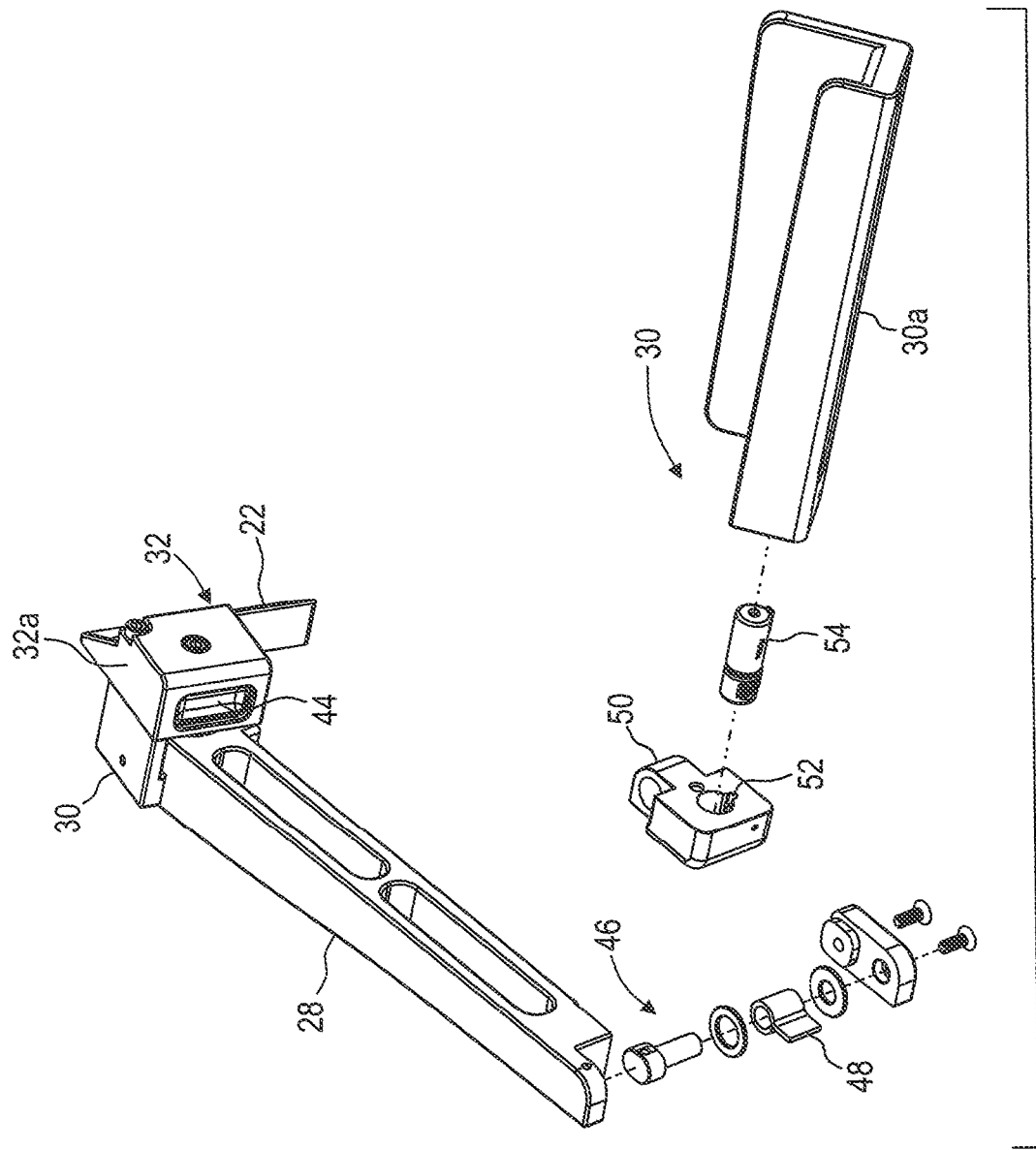

TABLET HOLDER

CROSS-REFERENCE TO RELATED APPLICATIONS

This is a Non-Provisional Application claiming the benefit of Provisional Application No. 62/991,959 filed Mar. 19, 2020.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

Field of the Invention

The present invention relates generally to holders for informational displays such as tablet computers, that can be conveniently mounted on seat backs.

Discussion of the Prior Art

It is common for passenger aircraft, trains and buses to provide various types of entertainment and information media sources such as video display monitors that are associated with the passenger's chair or seat. In many cases, it is also common for each passenger to have their own video display monitor, laptop computer, or the like which is frequently rested on the top of the utility tray associated with their seat. However, this practice is unsatisfactory for many types of electronic devices, such as smartphones, tablets and the like that need to be comfortably positioned in a location that permits the display screen to be readily accessed and visible. It is this prior art drawback that the present invention seeks to overcome by providing a novel informational display, or tablet holder assembly that can be connected to seatbacks such as those found in commercial airplanes. As will become apparent from the discussion that follows, the informational display holder of the present invention can function not only to support numerous types of informational displays such as electronic devices, but also to support common, printed informational displays such as books, magazines and the like.

BRIEF SUMMARY OF THE INVENTION

By way of brief summary, one form of the informational display holder assembly of the invention, hereinafter referred to as "tablet holder", is uniquely configured for use with a substantially upright seatback of the character found in commercial airlines, trains, and buses. In the preferred form of the invention, the tablet holder comprises a connector mechanism that is connected to one side of the upright seatback. Connected to the connector mechanism is a pivot hinge assembly to which an elongate extender arm is connected for movement between a stowed position and a deployed position. A display support arm assembly is hingeably connected to the elongate extender arm for movement between a folded position and an extended, article support position. In one form of the invention, the display support arm assembly includes a display support ledge that is rotatable about its longitudinal axis to permit optimum positioning of the informational display.

With the foregoing in mind, it is an object of the present invention to provide a tablet support that can be readily affixed to one side of a substantially upright seatback and one that can conveniently function to support numerous types of informational displays, including, but not limited to books, magazines, tablet computers, note book computers, media players, smart phones and the like.

Another object of this invention is to provide a tablet support of the character described in the preceding paragraph that can easily be moved by the seat passenger from a compact stowed configuration into an ideally positioned, deployed configuration.

Another object of the invention is to provide a tablet support of the character described in the preceding paragraphs which, when in its deployed configuration, permits the informational display to be readily visible and readily accessible by the passenger.

Another object of the invention is to provide a tablet support of the type described herein in which the pivot hinge assemblies of the tablet support are safely disposed within protective housings thereby preventing passenger finger pinch and like passenger injury.

Another object of the invention is to provide a novel tablet support of the type described in the preceding paragraphs which is of a compact simple design, is easy to install, and is easy to use.

The foregoing as well as other objects of the invention will be met by the novel tablet support illustrated in the drawings and described in the specification that follows.

BRIEF DESCRIPTION OF THE DRAWINGS

FIG. 4 is a greatly enlarged, generally perspective fragmentary view of the upper portion of one form of the tablet holder of the invention partly broken away to show internal construction and illustrating the location and configuration of the latching pin of the assembly.

FIG. 11 is a greatly enlarged, generally perspective, exploded view of one form of the tablet holder of the invention as it appears in a fully deployed configuration.

DESCRIPTION OF THE INVENTION

Figure 1A:
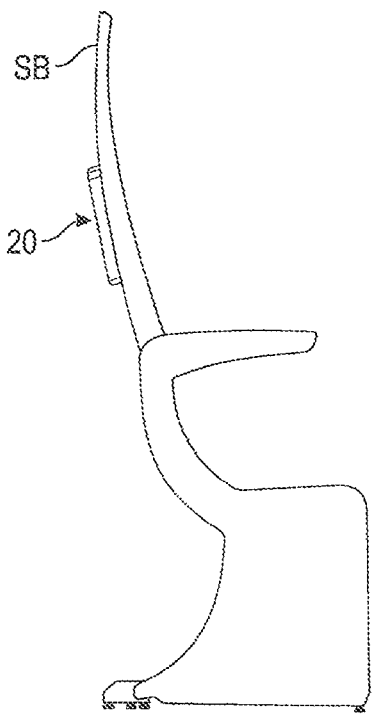
FIG. 1A is a side elevational view showing one form of the of the tablet holder of the invention as it appears when connected to the seatback of a passenger seat of the character found on many commercial airlines.
Figure 1B:
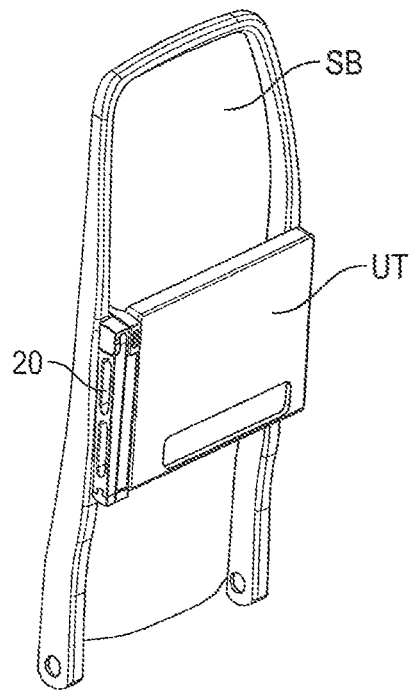
FIG. 1B is a generally perspective, right fragmentary view showing the tablet holder of the invention as it appears when connected to the seatback of a passenger seat alongside a utility table of the character connected to the back of the passenger seat.
Figure 1C:
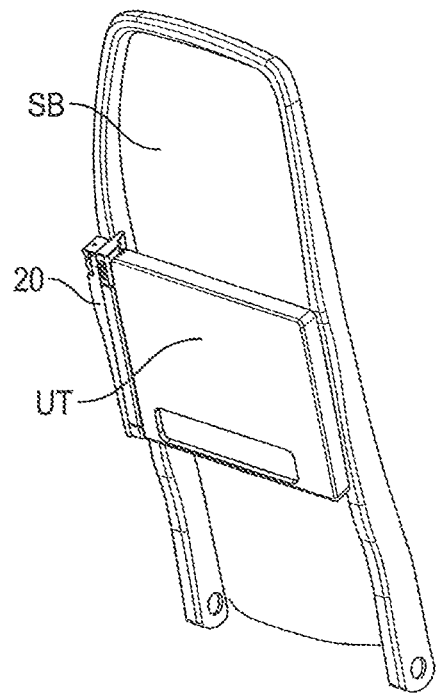
FIG. 1C is a generally perspective, left fragmentary view showing the tablet holder of the invention as it appears when connected to the seatback of a passenger seat alongside a utility table of the character connected to the back of the passenger seat.
Figure 3:
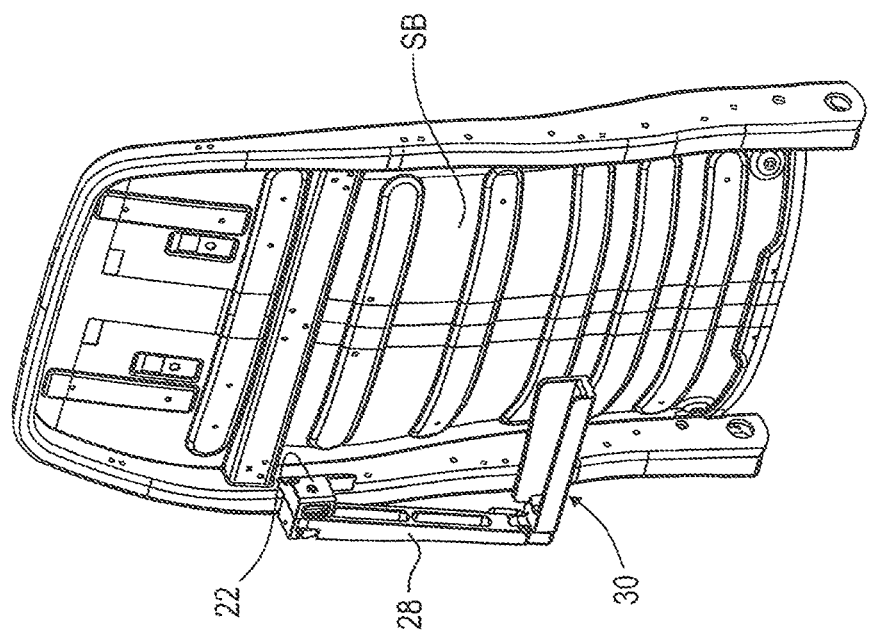
FIG. 3 is an enlarged, generally perspective, fragmentary view similar to FIG. 2, but showing the tablet holder as it appears in a deployed configuration.

Referring to the drawings and particularly to FIGS. 1A, 1B and 1C, one form of the novel tablet holder assembly of the invention is there shown connected to a seatback "SB", such as a seatback of the character found in a commercial aircraft. The tablet holder assembly, which is designated by the numeral 20, here comprises a connector assembly 22 (FIG. 2) that is connected to one side of the upright seatback at a location proximate a conventional utility table "UT". Connected to the connector assembly 22 is a first pivot hinge assembly 24 (FIG. 2) which includes a conventional pivot pin 26 (FIG. 4). Connected to the pivot hinge assembly 24 (FIG. 2) is an elongate extender arm 28 (FIG. 3) that is pivotal about pivot pin 26 from the first retracted position shown in FIG. 2 to the second extended position shown in FIG. 3. As illustrated in FIG. 3, an informational display support arm assembly 30 is hingeably connected to the extender arm for movement between the stowed position shown in FIG. 2 and the deployed position shown in FIG. 3.

Figure 2:
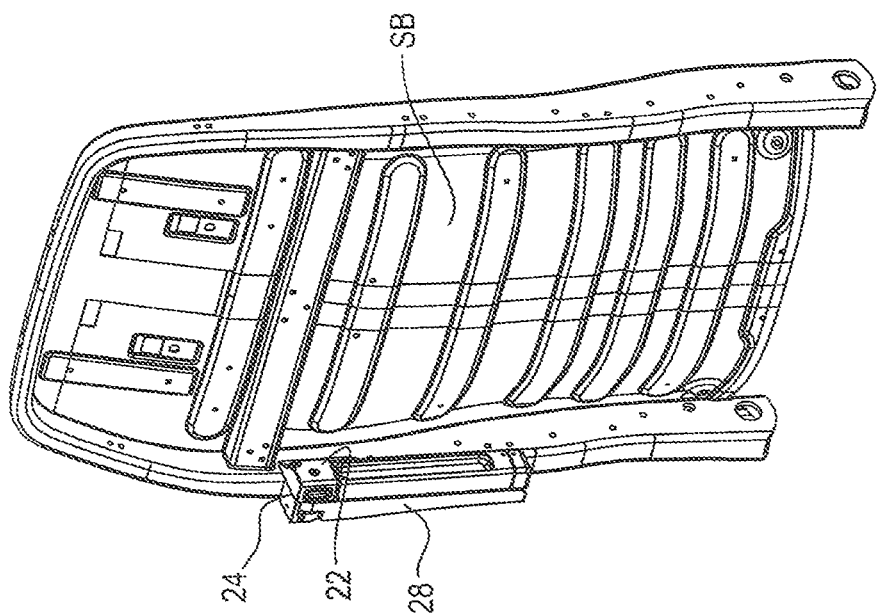
FIG. 2 is an enlarged, fragmentary rear elevational view of one form of the tablet holder of the invention as it appears in a stowed configuration and connected directly to one edge of the seatback of a passenger seat of the character found on many commercial airlines.

Operably associated with the first pivot hinge assembly 24 is a novel latching assembly 32 (FIG. 4), the character of which will presently be described. Both the first pivot hinge assembly and the latching assembly are housed within a protective housing 34. Operably associated with the latching assembly is a latch release assembly 36, the character of which will presently be described. Latch release assembly 36 is housed within a protective housing 38. Forming a part of latching assembly 32 is a latching pin 40 that extends inwardly toward extender arm 28 (FIG. 2).

Figure 6:
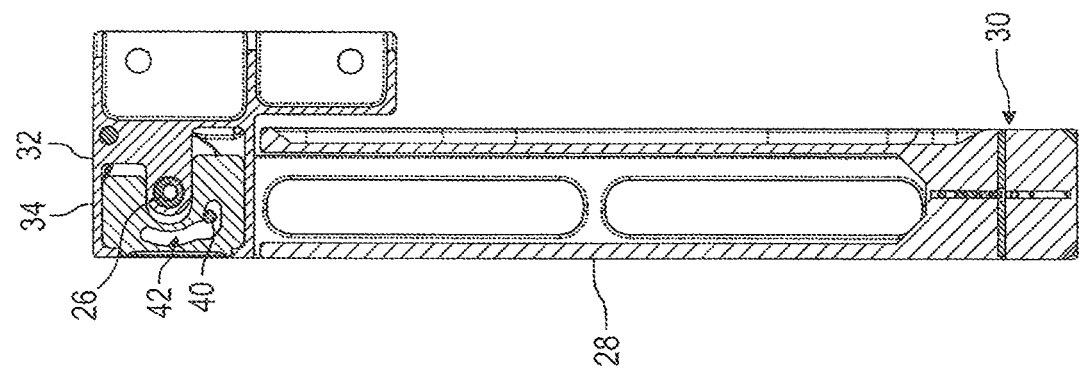
FIG. 6 is a cross-sectional view taken along lines 6-6 of FIG. 5.
Figure 5:
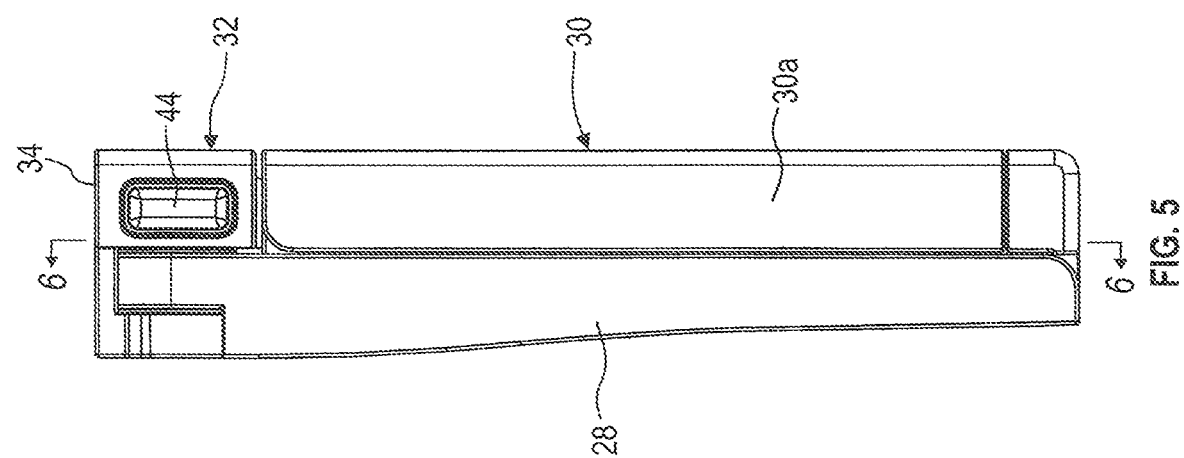
FIG. 5 is an enlarged, front view of one form of the of the tablet holder of the invention as it appears when in a stowed configuration.
Figure 8:
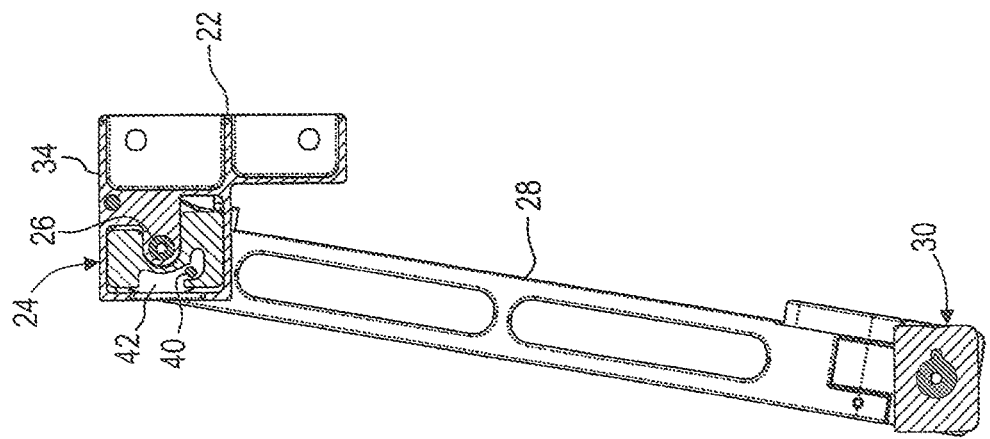
FIG. 8 is a cross-sectional view taken along lines 8-8 of FIG. 7.
Figure 7:
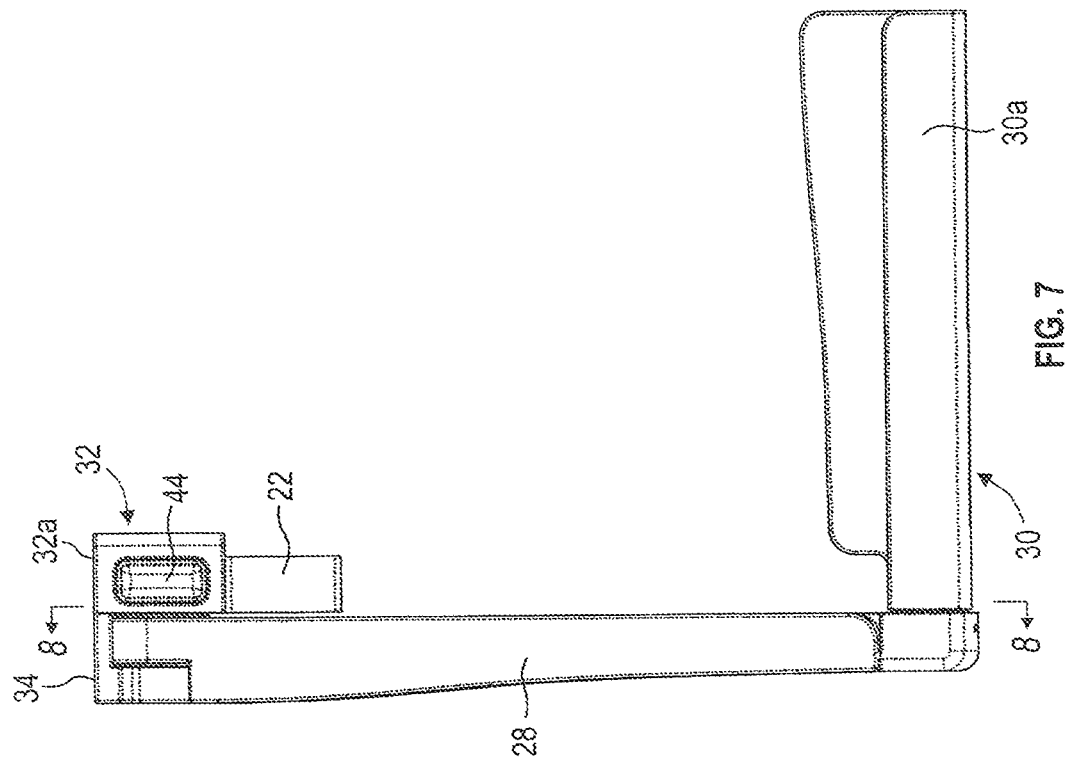
FIG. 7 is an enlarged, front view of one form of the of the tablet holder of the invention as it appears when in a deployed configuration.

To permit deployment of the tablet holder assembly into the operable position illustrated in FIG. 3 of the drawings, the latching pin 40 of the latch release assembly must be allowed to travel within a circuitous guide channel 42 formed in a push button 44 that comprises a part of the latch release assembly 36 (FIGS. 6 and 8). In this regard, it can be seen that when the latching pin resides within the guide channel in the location illustrated in FIG. 6 of the drawings, it is blocked against travel upwardly within the guide channel. Accordingly, rotation of the elongate extender arm 28 about pivot pin 26 will also be blocked. However, when the push button 44 is depressed by the user by pushing it inwardly to the position shown in FIG. 8 of the drawings, the latching pin will reside in the release position shown in FIG. 8 thereby allowing free travel of the latching pin upwardly within the guide channel and allowing rotation of the elongate extender arm 28 about pivot pin 26.

Figure 10:
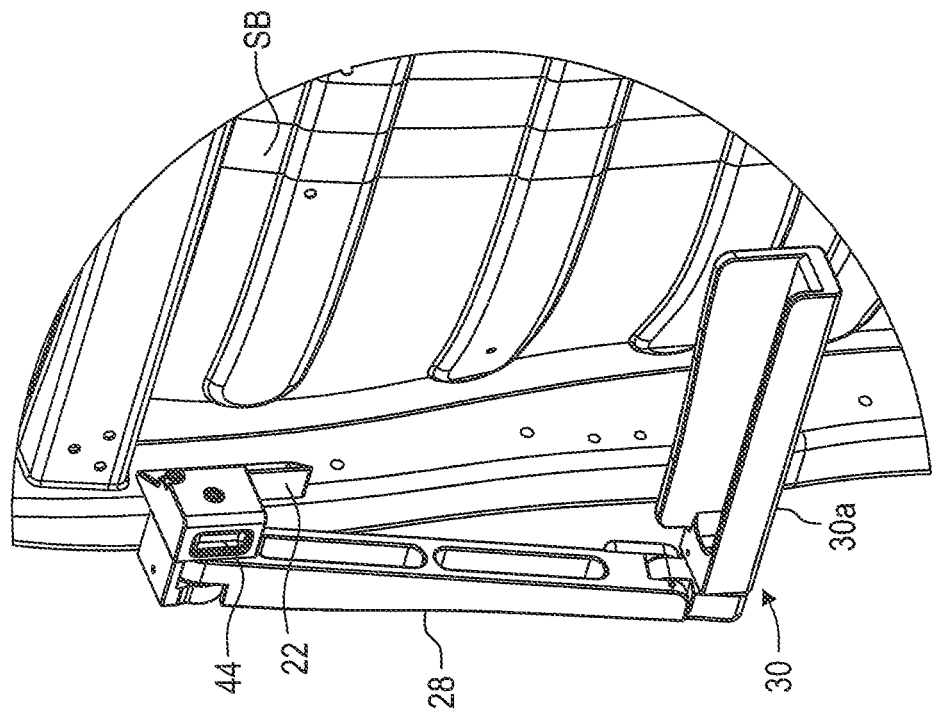
FIG. 10 is a greatly enlarged, generally perspective fragmentary view, similar to FIG. 9, showing one form of the tablet holder of the invention as it appears attached to a rear passenger seat and in a fully deployed configuration.
Figure 9:
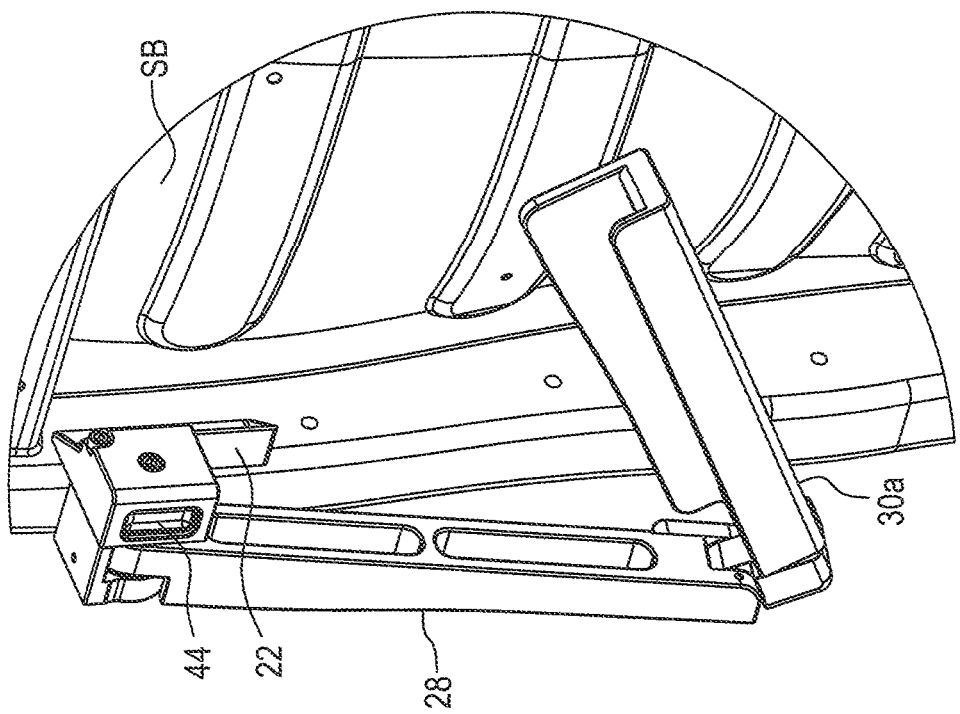
FIG. 9 is a greatly enlarged, generally perspective fragmentary view showing one form of the tablet holder of the invention as it appears attached to a rear passenger seat and in a partially deployed configuration.
Figure 13:
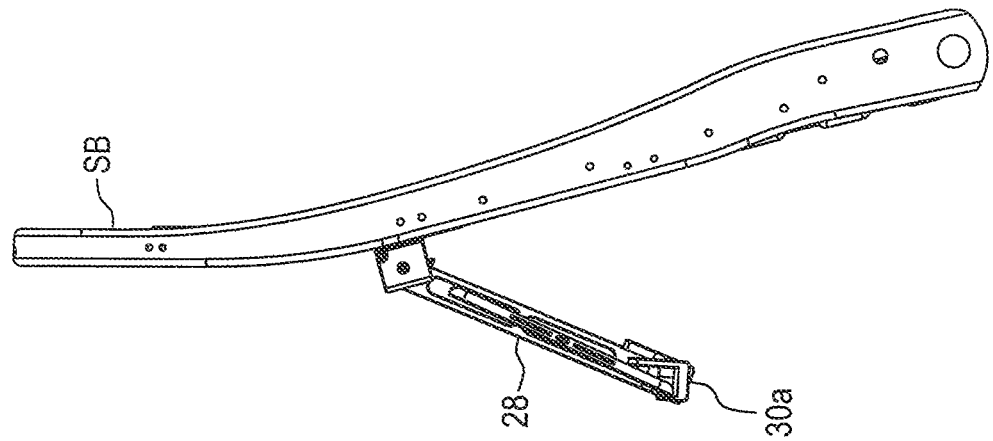
FIG. 13 is a side view taken along lines 13-13 of FIG. 12.
Figure 12:
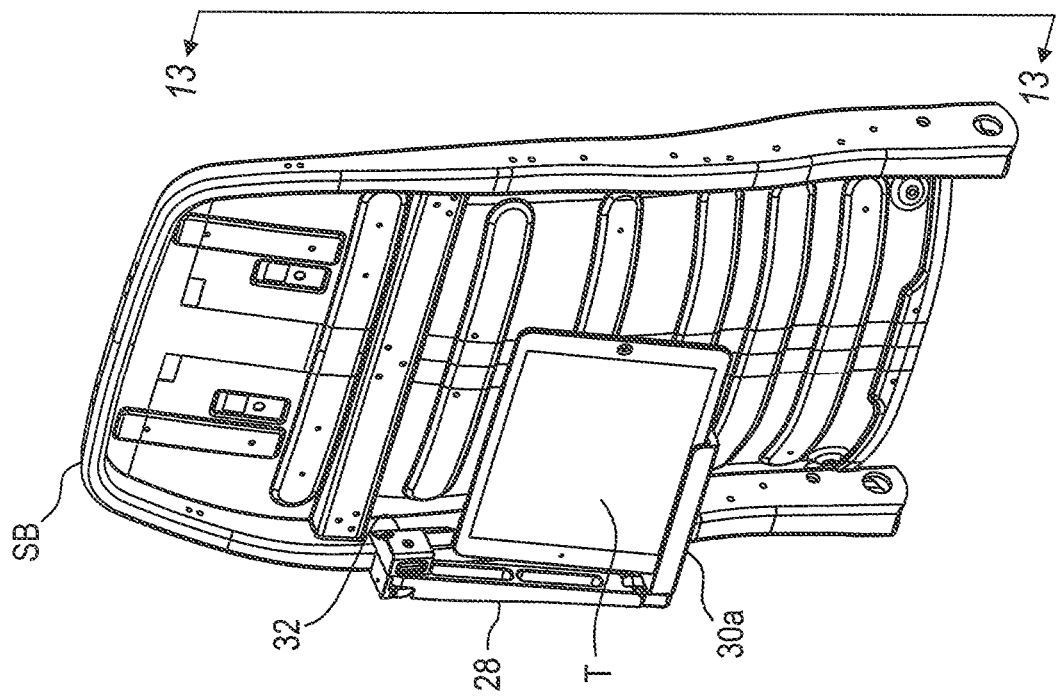
FIG. 12 is a generally perspective fragmentary view similar to FIG. 10 showing one form of the tablet holder of the invention connected to a passenger seatback as it appears when in a deployed configuration and when supporting a tablet holder of a conventional construction.

With the elongate extender arm 28 in the deployed position, the informational display support arm assembly 30 can then be pivoted outwardly in the manner shown in FIGS. 9 and 10. For this purpose, a second pivot hinge assembly 46 is connected to elongate extender arm 28 in the manner illustrated in FIG. 11 of the drawings. Pivot hinge assembly 46 comprises a hinge 48 that is readily commercially available from Hanaya, Inc. having a place of business at Dr Point Vedra, Florida. Hinge 48, which is mounted transversely of the outboard end of extender arm 28, is held in position by a connector member 50 having a central bore 50a. Bore 50a is provided with a longitudinal slot 52 that is adapted to receive a key provided on a friction hinge 54. Friction hinge 54, which is readily commercially available from several sources, including Reel Precision Manufacturing Company of St. Paul, Minnesota, is connected to informational display support arm assembly 30. Friction pivot hinge 54, which is connected to the inboard end of the support arm 30a of the support arm assembly, permits controlled rotation of the support arm so as to enable the user to position the support arm at an angle that will enable the optimum positioning of the informational display, or tablet "T" on the support arm, in the manner illustrated in FIGS. 12 and 13 of the drawings. As best seen in FIG. 11, support arm 30a is generally rectangular in cross-section to provide support to a variety of informational displays.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention as set forth in the following claims.

I claim:

1. An informational display holder assembly for use with a substantially upright seatback, comprising:
   (a) a connector mechanism connected to the upright seatback;
   (b) a first pivot hinge assembly connected to said connector mechanism;
   (c) an elongate extender arm connected to said first pivot hinge assembly for movement between a retracted position and an extended position;
   (d) a latching assembly connected to said first pivot hinge assembly for preventing movement of said elongate extender arm between a retracted position and an extended position, said latching assembly including:
      (i) a push button movable from a first latching position to a second release position, said push button having a circuitous guide channel;
      (ii) a latching pin extending from said circuitous guide channel into engagement with said elongate extender arm; and
   (e) an informational display support arm assembly hingeably connected to an elongate extender arm for movement between a stowed position and an extended position, said informational display support arm assembly being constructed and arraigned to engage said elongate extender arm when said elongate extender arm is in said extended position.

2. The informational display holder assembly as defined in claim 1 in which said informational display support arm assembly is rotatably connected to said elongate extender arm.

3. The informational display holder assembly as defined in claim 1 in which said informational display holder assembly further includes a latch release mechanism operably associated with said latching mechanism for permitting movement of said elongate extender arm between a retracted position and an extended position.

4. A tablet holder assembly for use with a substantially upright seatback, comprising:
    (a) a connector mechanism connected to the upright seatback;
    (b) a first pivot hinge assembly connected to said connector mechanism;
    (c) an elongate extender arm assembly connected to said first pivot hinge assembly for movement between a retracted position and a deployed an extended position;
    (d) a support arm assembly rotatably connected to said elongate extender arm;
    (e) a latching mechanism operably associated with said first pivot hinge assembly for preventing movement of said elongate extender arm between a retracted position and an extended position, said latching assembly comprising a latching pin; and
    (f) a latch release assembly connected to said latching assembly, said latch release assembly comprising a push button having a circuitous guide channel.

5. The tablet holder assembly as defined in claim 4 in which said elongate extender arm assembly further includes a second pivot hinge assembly.

6. The tablet holder assembly as defined in claim 4 in which said latch release assembly is connected to said latching mechanism.

7. The tablet holder assembly as defined in claim 4 in which said tablet holder assembly includes a friction hinge.

8. The tablet holder assembly as defined in claim 4 in which said tablet holder assembly includes an elongate, generally U-shaped channel.

9. A tablet holder assembly for use with a substantially upright seatback, comprising:
    (a) a connector mechanism connected to the upright seatback;
    (b) a first pivot hinge assembly connected to said connector mechanism;
    (c) an elongate extender arm assembly connected to said first pivot hinge assembly for movement between a retracted position and an extended position;
    (d) a support arm assembly rotatably connected to said elongate extender arm;
    (e) a latching mechanism connected to said first pivot hinge assembly for preventing movement of said elongate extender arm between a retracted position and an extended position; and
    (f) a latch release mechanism operably associated with said latching mechanism for permitting movement of said elongate extender arm between a retracted position and an extended position.

10. The tablet holder assembly as defined in claim 9 in which said latch release mechanism comprises a push button assembly connected to said connector mechanism, said push button assembly including a push button movable between an extended position and a depressed position.

\* \* \* \* \*